March 22, 1960     L. E. MULLER     2,929,232
TORQUE BALL ASSEMBLY
Filed Feb. 2, 1959
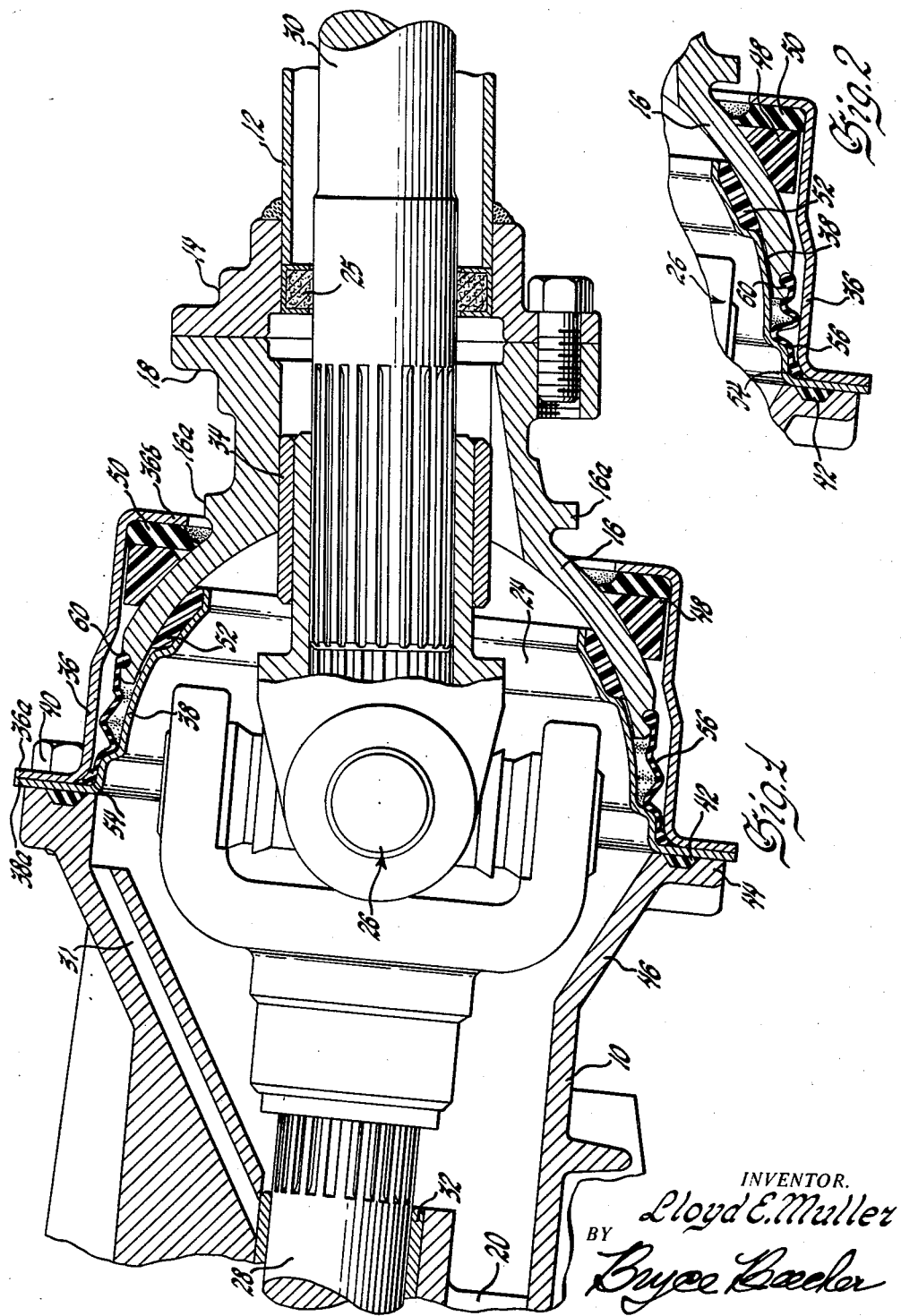
INVENTOR.
Lloyd E. Muller
BY
Bryce Baecher
ATTORNEY

2,929,232
TORQUE BALL ASSEMBLY

Lloyd E. Muller, Flint, Mich., assignor to General Motors Corporation, Detroit, Mich., a corporation of Delaware Application February 2, 1959, Serial No. 790,759

6 Claims. (Cl. 64—32)

This invention relates to a torque ball assembly particularly as applied in automotive vehicles incorporating a so-called torque tube drive.

In such a vehicle, the torque ball assembly surrounds a universal joint interconnecting two propeller shaft members. The purpose of the assembly is to render the torque tube drive correspondingly universally movable as is manifestly necessary. This universal movement must be accomplished without any lessening in the capacity of the torque tube drive to take braking and acceleration loads, which represents its primary function.

The present invention aims to provide a torque ball assembly exhibiting improved wearing qualities relative to the assemblies heretofore used.

Another object is to provide a torque ball assembly incorporating improved sealing means reducing oil leakage to a minimum not accomplishable with the seals employed heretofore.

Still another object is to provide a torque ball mechanism composed of easily fabricated and assembled parts.

In the accompanying drawings illustrating a preferred embodiment of the invention:

Figure 1 is an assembly view showing certain parts in elevation, others in section or broken away; and Figure 2 is a fragmentary view in which certain of the parts shown appear in displaced positions relative to Figure 1.

In the drawings, the numeral 10 denotes a first torque tube portion, which is located in the drive train nearest the vehicle transmission. A second torque tube portion 12 extends rearwardly for connection to the differential housing, like the transmission, not shown. A flange 14 welded or otherwise suitably secured to the tube 12 adapts such tube for connection to the torque ball 16 comprising a flange portion 18 complementary to the flange 14.

The chamber 24 delineated by torque ball 16 is supplied with fluid for lubrication of universal joint 26 via a passage 20 which is open to the transmission, not shown. Joint 26 interconnects two drive shaft sections 28 and 30 having splined ends for connection to the respective universal joint parts.

Universal joints, as illustrated, are well understood by those skilled in the art in point both of their construction and operation. It is, therefore, unnecessary to supply a detailed description here.

Reverting to the torque tube portion 10, it will be observed that a passage 31 is formed therein in the interest of providing for splash lubrication of the bearing at bushing 32. A second bushing 34 is located within the torque ball 16 and is similarly lubricated. A seal 25 prevents entry of lubricant into chamber 24 from the vehicle differential, not shown.

The torque ball is surrounded by a retainer element 36 of generally cylindrical conformation and itself partially surrounds an inner retainer element 38 which, like the torque ball, is of concavo-convex conformation. Retainers 36 and 38 are secured to the torque tube member 10 via volts 40 extending through flanges 36a and 38a integral with the retainers, the flanges being disposed over an annular seal 42 accommodated by a recess in the face of the flange 44 in which the flared end 46 of the torque tube portion 10 terminates.

The purpose of element 36 is to retain a bearing ring 48 which may be formed, for example, of nylon or Teflon, preferably carried on a sintered iron base. This bearing ring is backed by a rubber ring 50 abutting a second flange portion 36b of the retainer 36. Ring 50 is placed under compression at assembly to axially load the ring 48. The axial loading may amount, for example, to about 1,500 lbs.

Retainer element 38 is formed to seat a ring of low-friction bearing material 52, desirably of phenolic composition, engaging the concave surface of the torque ball 16. Such element, with the retainer 36, clampingly secures the ring end 54 of a bellows seal 56 bridging the space between the torque ball and flanges 36a and 38a. The other end ring 60 of the bellows seal 56 finds accommodation in an annular groove formed in the torque ball 16. As indicated, the end ring 60 should have a snap action and to this end may incorporate a spring metal annulus.

The deformation of the bellows spring 56 incident to the relative angular displacements of the torque tube portions is illustrated by Figure 2. This seal has been found to substantially lessen leakage difficulties usually experienced with prior seals. To preclude the possibility of its being pinched or cut, torque ball 16 will be noted as provided with a rib 16a which makes contact with the flange portion 36b of the retainer 36 to limit the extent of the angular displacements between the torque tube portions.

What is claimed is:

1. In an assembly of the class described, a first torque tube portion, a second torque tube portion in general axial alignment with said first torque tube portion, a concavo-convex member secured to said second torque tube portion at the end thereof nearest said first torque tube portion and disposed with its concave face in open spaced relation to said first torque tube portion, first and second retainer elements fastened to said first torque tube portion, said first retainer element seating a low-friction material in contact with the concave surface of said member, said second retainer element surrounding said member to confine and locate bearing means engaging the convex surface of said member together with means placing said bearing means under axial load, and a bellows seal bridging the space mediate said first torque tube portion and said concavo-convex member.

2. In an assembly of the class described, a first torque tube portion having a flared end terminating in a flange, a second torque tube portion in general axial alignment with said first torque tube portion, a concavo-convex member secured to said second torque tube portion at the end thereof nearest said flange and disposed with its concave face in open spaced relation to said first torque tube portion, first and second retainer elements fastened to said flange, said first retainer element seating a low-friction material in contact with the concave surface of said member, said second retainer element surrounding said member to confine and locate bearing means engaging the convex surface of said member together with means placing said bearing means under axial load, and an annular bellows seal having end ring portions secured respectively to said member and between said retainer elements at the point of their connection with said flange, said seal bridging the space between said flange and said member.

3. In an assembly of the class described, a first torque tube portion having a flared end terminating in a flange, a second torque tube portion in general axial alignment with said first torque tube portion, a concavo-convex member secured coaxially to said second torque tube portion at the end thereof nearest said flange and disposed with its concave face in open spaced relation to said first torque tube portion, a first retainer element of generally concavo-convex conformation having a flange by means of which it is secured to the flange of said first torque tube member, said first retainer element carrying a ring of friction material on the convex portion thereof and contacting the concave surface of said member, a second retainer element of generally cylindrical conformation having a flange secured to said first flange over the flange of said first retainer element, said second retainer element surrounding said member to confine and locate an annular bearing ring engaging the convex surface of said member together with resilient means placing said bearing ring under an axial load, and a bellows seal bridging the space mediate said first torque tube portion and said member.

4. In an assembly of the class described, a first torque tube portion having a flared end terminating in a flange, a second torque tube portion in general axial alignment with said first torque tube portion, a concavo-convex member secured coaxially to said second torque tube portion at the end thereof nearest said flange and disposed with its concave face in open spaced relation to said first torque tube portion, a first retainer element of generally concavo-convex conformation having a flange by means of which it is secured to the flange of said first torque tube member, said first retainer element carrying a ring of friction material on the convex portion thereof and contacting the concave surface of said member, a second retainer element of generally cylindrical conformation having a flange secured to said first flange over the flange of said first retainer element, said second retainer element surrounding said member to confine and locate an annular bearing ring engaging the convex surface of said member together with resilient means placing said bearing ring under an axial load, and an annular bellows seal having end rings one of which finds accommodation in an annular groove formed in the outer surface of said member, the other of which is clampingly engaged between said elements at the flanged ends thereof, said seal bridging the space mediate said first torque tube portion and said member.

5. An assembly as defined by claim 4 where the resilient means axially loading said bearing ring is a rubber ring.

6. An assembly as defined by claim 4 where the end face of said first flange is recessed to accommodate an annular seal overlaid by the flanges of said elements.

References Cited in the file of this patent
UNITED STATES PATENTS

| | | |
|---|---|---|
| 2,473,899 | Murphy | June 21, 1949 |
| 2,653,456 | Heym | Sept. 29, 1953 |
| 2,847,837 | Baker | Aug. 19, 1958 |
| 2,854,829 | Porter | Oct. 7, 1958 |